(12) United States Patent
Lampola

(10) Patent No.: US 7,173,940 B2
(45) Date of Patent: Feb. 6, 2007

(54) PROVIDING GATEWAY FUNCTIONALITY IN A VIRTUAL PRIVATE NETWORK

(75) Inventor: Pekka Lampola, Helsinki (FI)

(73) Assignee: Nokia Corporation, Espoo (FI)

( * ) Notice: Subject to any disclaimer, the term of this patent is extended or adjusted under 35 U.S.C. 154(b) by 1065 days.

(21) Appl. No.: 10/161,110

(22) Filed: May 31, 2002

(65) Prior Publication Data

US 2003/0016681 A1  Jan. 23, 2003

Related U.S. Application Data

(63) Continuation of application No. PCT/EP99/09388, filed on Dec. 1, 1999.

(51) Int. Cl.
*H04L 12/28* (2006.01)

(52) U.S. Cl. .................. 370/401; 370/399; 370/410

(58) Field of Classification Search ..................
370/395.1–395.72, 400–411
See application file for complete search history.

(56) References Cited

U.S. PATENT DOCUMENTS

| | | | | |
|---|---|---|---|---|
| 5,826,239 | A | * | 10/1998 | Du et al. .................. 705/8 |
| 6,075,852 | A | * | 6/2000 | Ashworth et al. ..... 379/201.02 |
| 6,160,882 | A | * | 12/2000 | Weik et al. ............. 379/220.01 |
| 6,751,308 | B1 | * | 6/2004 | Sahala .......................... 379/225 |
| 6,801,523 | B1 | * | 10/2004 | Osman ........................ 370/352 |

FOREIGN PATENT DOCUMENTS

WO  9821903  5/1998

OTHER PUBLICATIONS

Signalling System No. 7—Applicaiton transport mechanism—Support of VPN applications with PSSI information flows: UTU-T Recommendation Q.765.1 (May 1998) XP002144798, pp. 15, 22.

Allard, F. Broadband Virtual Private Network Signalling: BT Technology Journal GB.BT Laboratories, vol. 16, No. 2, Apr. 1998, pp. 112-119. XP000750523, ISSN: 1358-3948, p. 113.

"Signalling System No. 7—Application transport mechanism—Support of VPN applications with PSS1 information flows;" Series Q: Switching and Signalling, Specifications of Signalling System No. 7—ISDN user part; ITU-T Recommendation Q.765.1; May 1998.

(Continued)

*Primary Examiner*—Chi Pham
*Assistant Examiner*—Phuc Tran
(74) *Attorney, Agent, or Firm*—Alfred Fressola; Ware, Fressola, Van Der Sluys & Adolphson LLP

(57) ABSTRACT

The present invention relates to a signaling method and a network element for a virtual private network, wherein a request for dropping a signaling of the virtual private network is transmitted from a network element (DXD) to a proceeding network element (DXC), if the network element (DXD) detects that the virtual private network signaling cannot be continued through a connection of the telecommunication network. A predetermined network element (DXB) is provided for transmitting a transparency information indicating a virtual private network signaling transparency to an originating network element (DVA) of the connection in response to the receipt of the dropping request, and the virtual private network signaling is collected at the predetermined network element. (DXB) Thereby, the public network operator is allowed to optimize the VPN signaling load and service provision by arranging the predetermined network element (DXB) at a suitable location in the transmission network.

18 Claims, 3 Drawing Sheets

OTHER PUBLICATIONS

"Integrated Services Digital Network (ISDN); Digital Sugscriber Signalling System No. one (DSS1) protocol; Basic call control; Enhancement at the "b" service entry point for Virtual Private Network (VPN) applications; Part 1; Protocol specification;" (ETSI) En 301 060-1 V1.2.2 (Apr. 1998).

"Integrated Services Digital Network (ISDN); Digital Subscriber Signalling System No. one (DSS1) protocol; Generic functional protocol for the support of supplementary services at the "b" service entry point for Virtual Private Network (VPN) applications; Part 1: Protocol specification;" (ETSI) EN 301-061-1 V1.2.2 (Apr. 1998).

"Integrated Services Digital Network (ISDN); Signalling System No. 7; Support of virtual Private Network (VPN) applications with Private network Q reference point Signalling System No.1 (PSS1) information flows; Part 1: Protocol specification;" (ETSI) EN 301 062-1 V1.2.3 (Oct. 1999).

"Integrated Services Digital Network (ISDN); Signalling System No. 7 (SS7); ISDN user Part (ISUP); Application transport mechanism; Part 1: Protocol specification;" (ETSI) EN 301 069-1 V1.3.1 (Feb. 2001).

"Private Integrated Services Network (PISN); Inter-exchange signalling protocol; Circuit-mode basic services;" ETSI; ETS 300 172, Nov. 1995, Third Edition.

"Private Integrated Services Network (PISN); Inter-exchange signalling protocol; Generic functional protocol for the support of supplementary services;" (ETSI) ETS 300 239; Nov. 1995, Second Edition.

"Integrated Services Digital Network (ISDN); Digital Subscriber Signalling System No. one (DSS!) protocol; Data link layer; Part 1: General aspects;" (ETSI) ETS 300 402-1; Nov. 1995.

"Series Q: Switching and Signalling; Signalling System No. 7-Application transport mechanism-Support of VPN applications with PSS1 information flows;" ITU-T Q.765.1; May 1998.

"DX 200; QSIG, Service Description Document Class 1.11;" Nokia Telecommunications; K. Sahala; Sep. 1997.

* cited by examiner

PROVIDING GATEWAY FUNCTIONALITY IN A VIRTUAL PRIVATE NETWORK

CROSS-REFERENCE TO RELATED APPLICATIONS

This application is a continuation of International Application PCT/EP99/09388 having an International Filing Date of 1 Dec. 1999 and from which priority is claimed under all applicable sections of Title 35 of the United States Code including, but not limited to, Sections 120, 363 and 365(c).

FIELD OF THE INVENTION

The present invention relates to a signaling method and a network element for a telecommunication network providing a virtual private network (VPN).

BACKGROUND OF THE INVENTION

The VPN concept allows private traffic traditionally served by leased private lines to share the existing trunk capacity of the PSTN (Public Switched Telecommunication Network). This allows for a more efficient utilization of network resources and provides a number of benefits to both operators and users. Network costs can be more closely tied to actual usage. With private networks, the cost of intersite traffic is tied to the maximum capacity required, not overall usage. VPN also allows for increased flexibility in configuring the network.

QSIG (unified international corporate network signaling standard) is an ISDN common channel signaling system designed for use in corporate networks. It was developed in an open forum for all major European PBX manufacturers. The name QSIG refers to signaling across the ISDN "IQ" reference point which is the logical signaling point between two PINXs (Private Integrated Services Network Exchanges). For private ISDNs, only one protocol is necessary as the QSIG protocols have sufficient functionality to be used both within the network at transit nodes and outside at access nodes. Hence, QSIG can be used between all PINXs. In particular, QSIG defines a set of protocols for the interaction of PINXS, so that common sets of services and features, with similar appearances, are available to users across private networks, including multi-site networks.

A single QSIG port can be utilized to carry traffic to any or all other points in the VPN. The most common QSIG Access is a 2 Mbit/s interface which implements up to thirty 64 kbit/s B-channels and one 64 kbit/s virtually B-channel structure (30B+D structure). However, other access structures such as a 2B+D structure are possible, as well. In addition to supporting private traffic, the QSIG interfaces can provide a gateway functionality to carry traffic to and from a PSTN, resulting in increased efficiency in the provision of access ports. The VPN is always customer-specific and a system must be configured to suit the particular customer's requirements. The provision of the VPN network may be based on a software product running on the respective network switches. The maximum number of VPN groups depends on the data standard for the switches involved. A VPN indicator in the signaling defines the context to be used.

The original standards for QSIG were developed by the ECMA (European Computer Manufacturers Association). Later, these standards were used as a basis for the ETSI (European Telecommunications Standards Institute). The main standards covering the Basic Call Protocol are Layer 2 ETS 300 402-1 based on ITU-T Q.920 and Layer 3 ETS 300 172 (for the PSS1 signaling system) based on ISO/IEC 11572, or EN 301 060 (for the DSS1+ signaling system).

In addition thereto, a standard which covers the Core Generic Functional Protocol for supplementary services for private telecommunication networks has been developed by ISO (ISO/IEC 11582) and given the ETSI identification ETS 300 239. This is the core protocol that the individual supplementary services use to avail of the transport services of the underlying layers.

A VPN product provides QSIG interfaces for interconnecting remote PINXs across the PSTN, either via a single exchange or via a number of exchanges in the network. Conceptually, the entire exchange network is seen by the end PINXs as a simple transit network.

The transport of the QSIG signaling over the PSTN (e.g. ISDN network) is accomplished by "enveloping" QSIG messages within ISUP (ISDN User Part) messages. This method enables common ISUP signaling links and associated bearers to be provisioned for VPN and non-VPN traffic for greater efficiency.

To be able to offer a true on-net call and to provide for the transparent transfer of QSIG messages over the PSTN from the VPN entry point to the VPN exit point (when the VPN extends over multiple exchanges), a technique called Application Transport Mechanism (APM) is used. This means that a call is set up over the PSTN to provide for the connection, and all associated QSIG data is transmitted along the call with the APM mechanism. The receiving end extracts the data and sends an identical message to the destination PINX. Thus, PINXs see the network as a dedicated private network with QSIG signaling.

Since there may be parts of the PSTN that do not support the signaling, or the destination subscriber is not capable of supporting the protocol, a method has been suggested to drop the call to support only a basic call. When such a situation is detected, a so-called gateway function is performed and the necessary parts of the private network signaling are transformed to a PSTN signaling. If transparency is lost, i.e. the destination does not support QSIG, then the QSIG data is dropped from subsequent messages and a gateway function is performed in the network after this condition is detected. In particular, a gateway request indicating that no QSIG information transparency can be achieved is sent from a first network exchange or switch to a preceding second network exchange or switch, if the first network switch recognizes that the QSIG information flow cannot be continued due to a lack of network signaling capability. This Gateway Request procedure is defined in the ETSI specification EN 301 062-1 (Q.765-1), chapter 7.2.3.2.6, "Gateway PINX transformation request mechanism". In addition thereto, the Gateway functionality of the QSIG-VPN is described in ETSI specification EN 301 069 and the ISO specifications ISO/IEC 11582 and ISO/IEC 11575.

However, according to the known method, the gateway request is forwarded to the originating network element, i.e. the respective Originating Local Exchange (OLE), such that the QSIG gateway functionality is always provided at the originating network element (OLE). Thus, QSIG-VPN network transmission load and service provision cannot be optimized by the public network operator.

SUMMARY OF THE INVENTION

It is therefore an object of the present invention to provide a signaling method and network element for a telecommunication network providing a virtual private network, by means of which the VPN signaling load and service provision can be optimized.

Said object is achieved by a signaling method for a telecommunication network providing a virtual private network, said signaling method comprising the steps of:

transmitting a request for dropping a signaling of said virtual private network from a network element to a preceding network element of said telecommunication network, if said network element detects that said virtual private network signaling cannot be continued through a connection of said telecommunication network;

transmitting a transparency information indicating a virtual private network signaling transparency from a predetermined network element to an originating network element of said connection, in response to the receipt of said dropping request; and collecting said virtual private network signaling at said predetermined network element of said telecommunication network.

Additionally, the above object is achieved by a network element for forwarding a signaling of a virtual private network provided in a telecommunication network, said network element comprising:

detecting means for detecting a request for dropping said virtual private network signaling, said dropping request being received from said telecommunication network if said virtual private network signaling cannot be continued through a connection of said telecommunication network;

signaling means for transmitting a transparency information indicating a virtual private network signaling transparency to an originating network element of said connection, in response to the receipt of said dropping request; and collecting means for collecting said virtual private network signaling.

Accordingly, the public network operator is allowed to optimize the transmission load and service provision of the virtual private network signaling by using a gateway functionality at any location of the transmission network instead of using the originating local exchange or the destination local exchange as in the known method. The information flow relating to the protocol signaling between exchanges or switches of the virtual private network can be kept active and collected at the predetermined network element. Thus, some of the signaling functions relating to the virtual private network can be centralized within the telecommunication network, to thereby collect the virtual private network information flows of the network to a certain point of the network, where the corresponding network services are offered.

In particular, the information flow is a concept used to describe the transmission of the information from one point of the network to another point. The information flow concept can be used to describe the signalling between two network nodes in concept level rather than actual network messages. It can also be used to describe a supplementary or a network service transmission through the network.

Preferably, the virtual private network signaling is a QSIG signaling.

Furthermore, the virtual private network signaling collected at the predetermined network element may be interpreted at the predetermined network element, and a network service determined by the interpretation may be provided to the originating network element. Thereby, the network switch collecting the virtual private network signaling information flows is able to provide some corresponding signaling network services to the users, which the other switches of the network cannot provide.

In case a network service cannot be provided by the predetermined network element, the transparency information is transmitted to the originating network element with a service rejection message.

The originating network element may be a local exchange, and the predetermined network element may be a network switch arranged in the telecommunication network.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following, the preferred embodiment of the signaling method and network element according to the present invention will be described on the basis of a network structure shown in FIG. 1.

Figure 1:
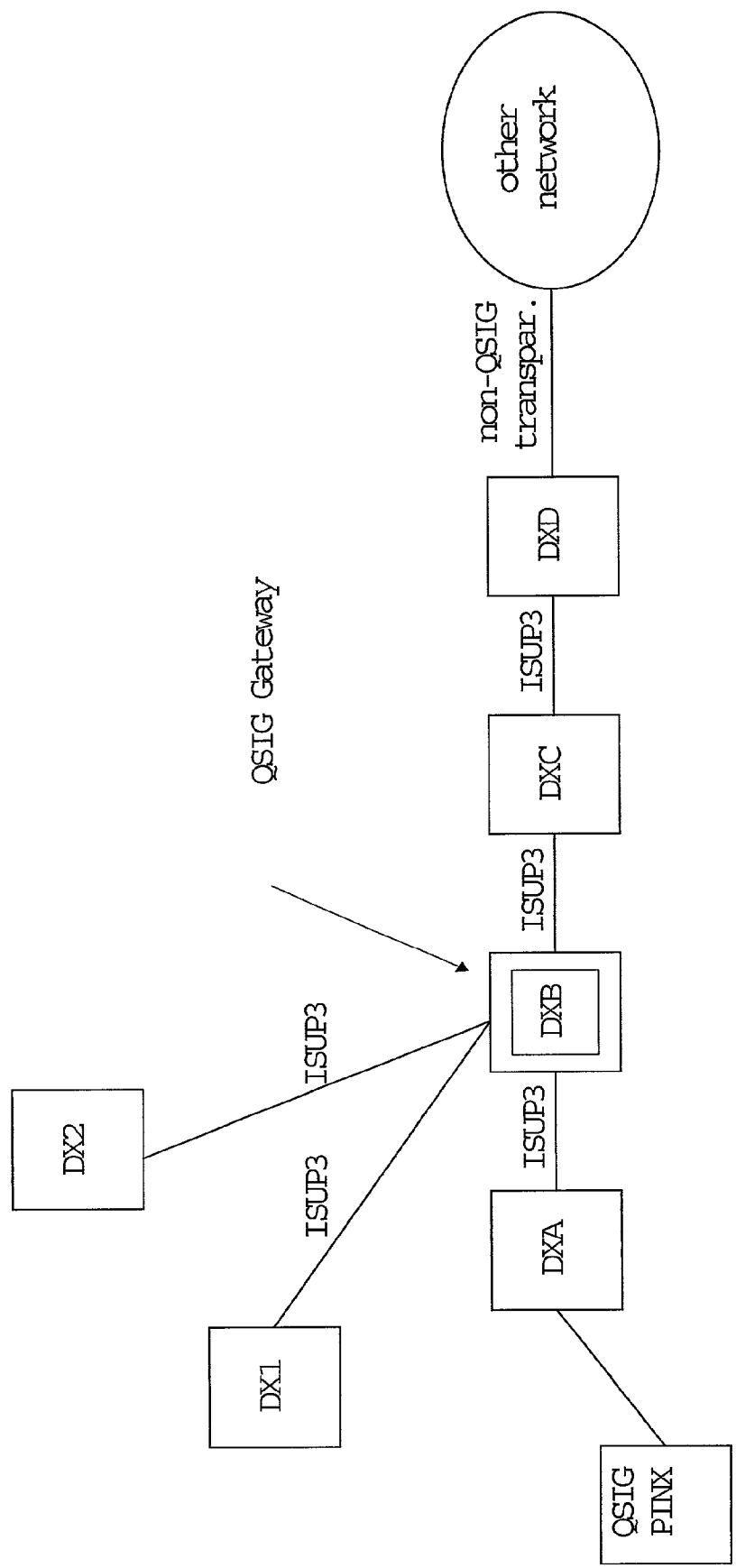
FIG. 1 shows a telecommunication network for providing a QSIG feature transparency, according to the preferred embodiment of the present invention.

The network structure of FIG. 1 may be a corporate network based on a virtual private network implemented in a public telecommunication network, wherein a QSIG PINX which is a QSIG capable PBX (Private Branch Exchange) is connected via a plurality of network exchanges or switches DXA, DXB, DXC and DXD to another network (e.g. a PSTN network) which lacks the required VPN signaling capability. The lack of support of QSIG may result from the provision of other types of network interfaces (e.g. ISUP1 or IISUP instead of ISUP3), other signaling types (e.g. TUP or R2 signaling), or missing co-operation agreements between the network operators. Therefore, the QSIG information flow cannot continue through the other network.

The network switches DXA to DXD are connected via ISUP3 (ISDN User Part 3) interfaces which enable the transmission of QSIG information. ISUP is a part of the Exchange Application Process underlying the VPN applications. The term "Exchange Application Process" is used to describe all application functionality in an exchange or switch.

In addition to the network switches DXA to DXD, other network switches DX1 and DX2 are connected to the network switch DXB via additional ISUP3 interfaces in a "star" architecture which allows QSIG parts to be provisioned more efficiently. In particular, a PINX connected to one of the network switches can be marked to be conforming to a specific reference or service entry point.

In case the call is determined to be a VPN internal call, a VPN call is setup as requiring QSIG feature transparency. Otherwise, a basic call is initiated. In the network switches or in a separate IN node, a private numbering plan (PNP) is stored, which allows for creation of an individual numbering scheme for each customer, wherein a translated number triggers the call to be routed to a particular extension in a PINX.

According to the preferred embodiment, the network switch DXB is configured as a QSIG Gateway Functionality in the middle of the transmission network. The network switch DXB is able to keep the QSIG information flow to the originating network element (network switch DXA) active and to collect the received QSIG information flow. As an option, the network switch DXB may additionally be configured to provide some of the QSIG network services to the users, which the other network switches DXA, DX1 and DX2 connected to the network switch DXB cannot provide. Such an arrangement may be used for centralizing some functions (e.g. QSIG services or the Gateway Functionality) of the network.

Figure 2:
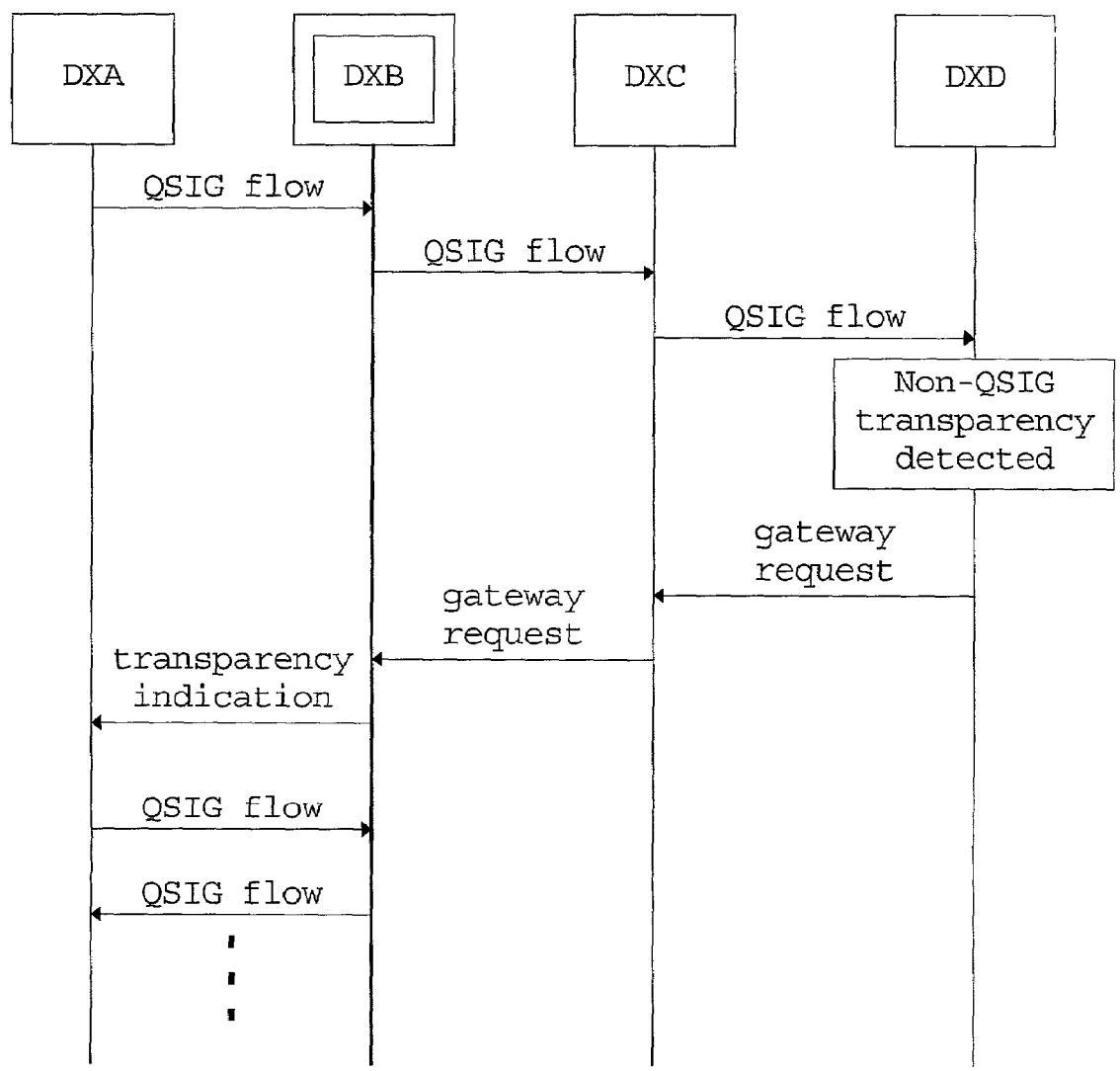
FIG. 2 shows a message flow diagram of a signaling method according to the preferred embodiment of the present invention.

FIG. 2 shows a diagram of a message flow in case a VPN connection is to be established from the originating node QSIG PINX via the network switches DXA to DXD to the other network. According to FIG. 2, the QSIG information flow originating from the originating node (QSIG PINX) is transmitted from the originating network element (local exchange DXA) via the ISUP3 interfaces of the network switches DXA to DXD to the other network. Then, the network switch DXD recognizes that the QSIG information flow cannot continue due to the lack of VPN signaling capability in the other network, and detects that no QSIG transparency can be provided in the established connection. Therefore, the network switch DXD performs a gateway functionality as defined in the initially described known method, and sends a gateway request to the preceding network switch DXC with an indication that no QSIG information transparency can be achieved. In particular, the network switch DXD sets a VPN feature transparency indication to "no indication". This gateway request is used in the network to indicate a non-QSIG transparency, wherein a network switch receiving the gateway request performs a gateway functionality and drops the QSIG information included in the received messages.

Accordingly, the network switch DXD transmits a QSIG information flow indicating a non-QSIG transparency and comprising a gateway request bit set to "Gateway PINX Transformation Request" to the preceding network switch DXC. The preceding network switch DXC has been configured by the public network operator as a conventional network switch which transmits the QSIG gateway request transparently. Thus, the gateway request comprising the indication of non-QSIG transparency is forwarded to the next preceding network switch DXB.

In contrast to the other network switches shown in FIG. 1, this network switch DXB has been configured not to transmit the QSIG gateway request backwards after the receipt thereof. The network switch DXB has been configured as a network's QSIG gateway arranged to transmit a VPN feature transparency indication to the originating local exchange DXA in response to the receipt of a gateway request. In case a required QSIG network service cannot be provided by the network switch DXB, it may send the QSIG service rejection received from the network switch DXD to the preceding network switch DXA, wherein a VPN feature transparency indication is set to "call with VPN feature transparency capability".

When the switch DXB derives from its own interpretation of the content of the QSIG information flow that it is able to provide all or some of the services requested, it sends the VPN feature transparency indication and provides the respective services to the originating network element (network switch or local exchange DXA).

The network switch DXA receives the VPN feature transparency indication from the network switch DXB and determines that the network ahead is QSIG transparent, Thus, the network switch DXA will always send all QSIG information received from the originating node QSIG PINX to the network switch DXB. Then, the QSIG information flow received by the network switch DXB from the network switch DXA is collected at the network switch DXB where some of the requested QSIG network services can be offered.

Accordingly, QSIG information flows are kept active and are collected at the network switch DXB and/or other network switches defined as QSIG gateways, such that the VPN signaling load can be optimized by the allocation of the gateway function to predetermined network switches.

Figure 3:
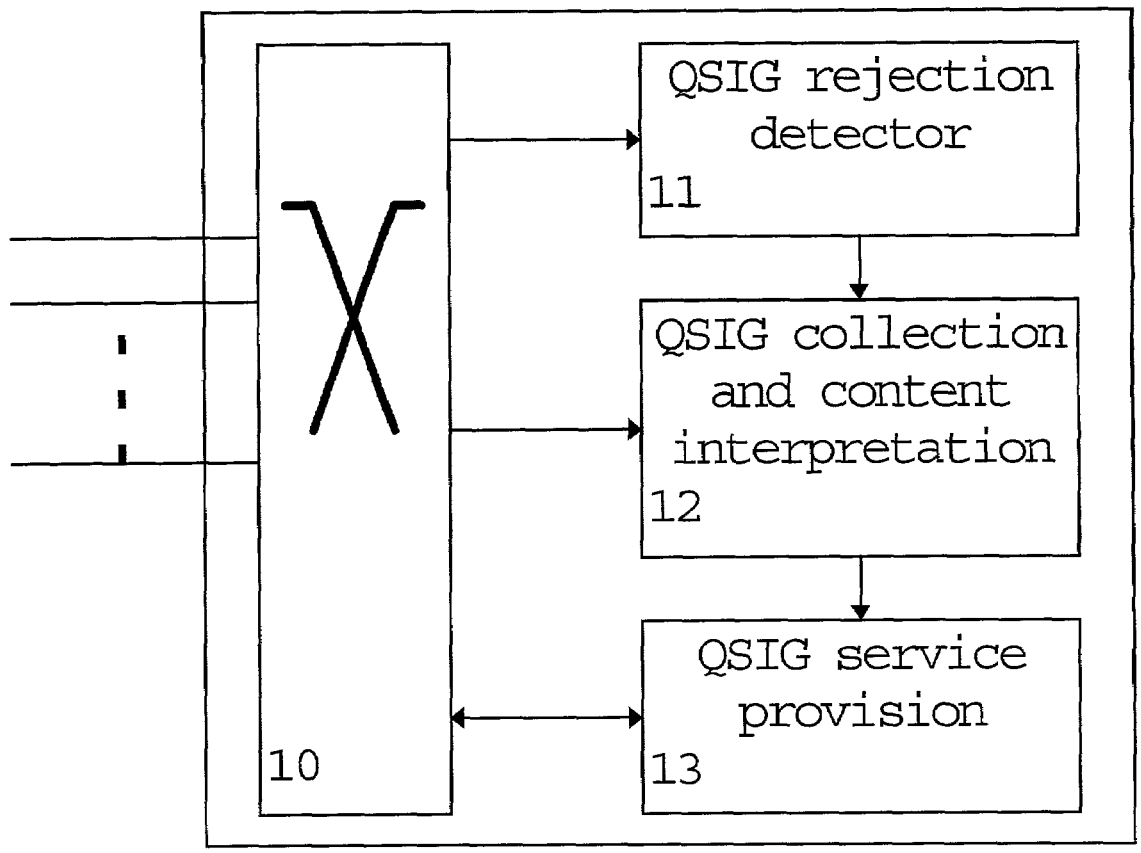
FIG. 3 shows a basic block diagram of a network element for forwarding a signaling of a virtual private network, according to the preferred embodiment of the present invention.

FIG. 3 shows a basic block diagram of the network switch DXB configured as the QSIG gateway. According to FIG. 3, the network switch DXB comprises a switching unit 10 provided for performing the required switching function between the network switches DXA, DX1, DX2 and DXC based on a received connection request. In case a gateway request is received via the switching unit 10, it is supplied to a QSIG rejection detector 11 which may be arranged to detect the setting of the gateway request bit.

Then, the QSIG rejection detector 11 supplies an instruction to a QSIG collection and content interpretation unit 12 which is arranged to collect any subsequent QSIG information flow received from the connection corresponding to the received gateway request. The QSIG collection and content interpretation unit 12 issues an instruction to a QSIG service provision unit 13 so as to output a VPN feature transparency indication to the switching unit 10. In response thereto, the switching unit 10 sends the VPN feature transparency indication to the preceding network switch DXA.

The QSIG collection and content interpretation unit 12 collects any subsequent QSIG information flow received from the concerned connection and interprets the content of the collected QSIG information. In case a service is required which can be provided by the QSIG service provision unit 13, the QSIG collection and content interpretation unit 12 issues a corresponding service instruction to the QSIG service provision unit 13 so as to provide the required service. In response thereto, the QSIG provision unit 13 generates a corresponding signaling and supplies the generated signaling to the switching unit 10 which forwards the signaling to the originating network element (network switch DXA).

In case the required service cannot be provided by the QSIG service provision unit 13, the QSIG collection and content interpretation unit 12 instructs the QSIG service provision unit 13 so as to output a QSIG service rejection message towards the originating network element.

It is noted that the functional blocks 11 to 13 indicated in FIG. 3 may be realized as concrete hardware structures or, alternatively, as routines of a control program adapted to control a processing means (e.g. CPU) provided in the network switch DXB. Furthermore, it is to be noted that the present invention may be applied to any telecommunication network providing a virtual private network function which requires support of a predetermined VPN signaling at a respective destination node. Furthermore, the signaling method according to the preferred embodiment may be performed in any network element arranged for forwarding a VPN signaling in the telecommunication network. The above description of the preferred embodiment and the accompanying drawings are therefore only intended to illustrate the present invention. The preferred embodiment of the invention may vary within the scope of the attached claims.

In summary, the present invention relates to a signaling method and a network element for a virtual private network, wherein a request for dropping a signaling of the virtual private network is transmitted from a network element to a preceding network element, if the network element detects that the virtual private network signaling cannot be continued through a connection of the telecommunication network. A predetermined network element is provided for transmitting a transparency information indicating a virtual private network signaling transparency to an originating network element of the connection, in response to the receipt of the dropping request, and the virtual private network signaling is collected at the predetermined network element. Thereby, the public network operator is allowed to optimize the VPN signaling load and service provision by arranging the predetermined network element at a suitable location in the transmission network.

What is claimed is:

1. A signaling method for a telecommunication network providing a virtual private network, said signaling method comprising the steps of:
   a) transmitting a request for dropping a signaling of said virtual private network from a network element (DXD) to a preceding network element (DXB) of said telecommunication network, if said network element (DXD) detects that said virtual private network signaling cannot be continued through a connection of said telecommunication network;
   b) transmitting a transparency information indicating a virtual private network signaling transparency from a predetermined network element (DXB) to an originating network element (DXA) of said connection, in response to the receipt of said dropping request; and
   c) collecting said virtual private network signaling at said predetermined network element (DXB) of said telecommunication network.

2. A method according to claim 1, wherein said virtual private network signaling is a QSIG signaling.

3. A method according to claim 2, further comprising the steps of interpreting the content of said collected virtual private network signaling at said predetermined network element (DXB), and providing a network service determined in said interpretation step to said originating network element (DXA).

4. A method according to claim 3, wherein said originating network element is a local exchange (DXA).

5. A method according to claim 4, wherein said transparency information is transmitted with a service rejection message, if a network service cannot be provided by said predetermined network element (DXB).

6. A method according to claim 1, further comprising the steps of interpreting the content of said collected virtual private network signaling at said predetermined network element (DXB), and providing a network service determined in said interpretation step to said originating network element (DXA).

7. A method according to any claim 1, wherein said originating network element is a local exchange (DXA).

8. A method according to claim 1, wherein said transparency information is transmitted with a service rejection message, if a network service cannot be provided by said predetermined network element (DXB).

9. A network element for forwarding a signaling of a virtual private network provided in a telecommunication network, said network element comprising:
   a) detecting means (11) for detecting a request for dropping said virtual private network signaling, said dropping request being received from said telecommunication network if said virtual private network signaling cannot be continued through a connection of said telecommunication network;
   b) signaling means (13) for transmitting a transparency information indicating a virtual private network signaling transparency to an originating network element (DXA) of said connection, in response to the receipt of said dropping request; and
   c) collecting means (12) for collecting said virtual private network signaling.

10. A network element according to claim 9, wherein said collecting means (12) is arranged to interpret the content of said collected virtual private network signaling, and said signaling means (13) is arranged to provide a network service determined by said collecting means to said originating network element (DXA).

11. A network element according to claim 10, wherein said signaling means (13) is arranged to transmit said transparency information with a service rejection message, if a network service cannot be provided by said signaling means (13).

12. A network element according to claim 11, wherein said originating network element is a local exchange (DXA).

13. A network element according to claim 12, wherein said network element is a network switch (Dx1, DX2).

14. A network element according to claim 13, wherein said virtual private network signaling is a QSIG signaling.

15. A network element according to claim 9, wherein said signaling means (13) is arranged to transmit said transparency information with a service rejection message, if a network service cannot be provided by said signaling means (13).

16. A network element according to claim 9, wherein said originating network element is a local exchange (DXA).

17. A network element according to claim 9, wherein said network element is a network switch (DX1, DX2).

18. A network element according to claim 9, wherein said virtual private network signaling is a QSIG signaling.

* * * * *